Jan. 11, 1949.   J. G. WEELDENBURG   2,458,886
METHOD OF BONDING CELLULOSIC MATERIALS TO RUBBER
AND COMPOSITE PRODUCTS FORMED THEREFROM
Filed April 12, 1946
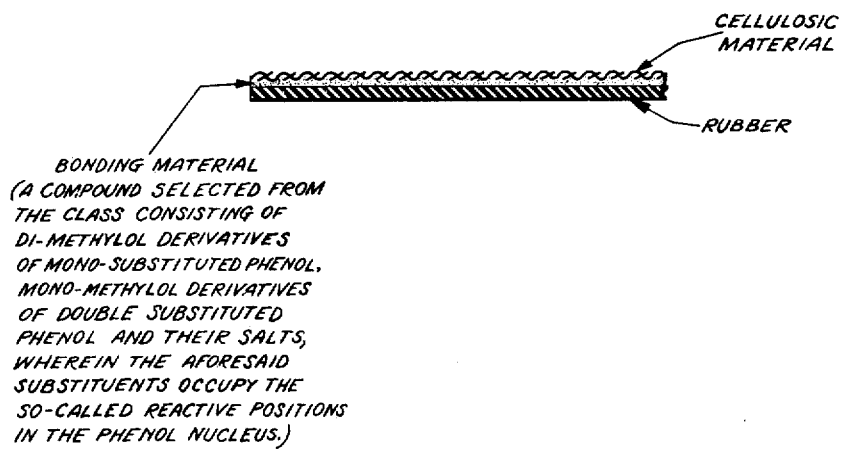
INVENTOR.
Johannes G. Weeldenburg
BY
Albin F. Knight
ATTORNEY Patented Jan. 11, 1949

2,458,886

UNITED STATES PATENT OFFICE 2,458,886

METHOD OF BONDING CELLULOSIC MATERIALS TO RUBBER AND COMPOSITE PRODUCTS FORMED THEREFROM

Johannes G. Weeldenburg, Velp, Netherlands, assignor to American Enka Corporation, Enka, N. C., a corporation of Delaware Application April 12, 1946, Serial No. 661,516
In the Netherlands September 15, 1945

8 Claims. (Cl. 154—139)

The present invention relates to bonding cellulosic materials to rubber and more particularly to a method of treating natural and regenerated cellulose, and rubber with aromatic alcohols and their salts that polymerize slowly to form linear polymers and which act as bonding agents between the cellulose and the rubber.

It is known to treat rayon, and cotton threads and fabrics with many types of compounds in an effort to cause the same to adhere more firmly to rubber stock. The agents generally employed are plastics such as resins derived from condensation products of phenol, urea and the like with formaldehyde and it is assumed that in the condensation of the molecules, three-dimensional nets are formed. However, in these types of resins, the polymerization process proceeds so rapidly that a compound formation with the cellulose and the rubber cannot take place. The resinous plastics are merely embedded in the materials without entering into a chemical combination with them.

The present invention contemplates the use of substances that do not polymerize as rapidly as the three-dimensional type and accordingly, will enter into a chemical reaction with cellulose and rubber to form a chemical bond between the same, thereby attaching them to each other.

It is a further object of this invention to effect a bond between cellulosic products and rubber by treating these substances with compounds such as dialcohols of mono-substituted phenols, mono-alcohols of double substituted phenols and their salts, which compounds are capable of forming only linear polymers as distinguished from three-dimensional polymers.

Other objects and advantages of the present invention will become apparent from the following description when considered in conjunction with the accompanying drawing which illustrates the laminated articles formed in accordance with the invention.

It is known that the phenol molecule ($C_6H_5OH$) can react with formaldehyde ($H_2CO$) to form a condensation product known as a phenol resin (Bakelite). When this reaction occurs, the three reactive hydrogen atoms of the phenol, i. e., those in positions numbered 2, 4, and 6, react with formaldehyde. The positions 2 and 6 are termed ortho positions and the position 4 is termed para position. Such a condensation product is assumed to form three-dimensional nets.

It is possible in the phenol molecule to substitute for one of the reactive hydrogen atoms, an organic radical such as the methyl group ($CH_3$) which forms a cresol, for example, para-cresol. Of course, it is to be understood that the invention is not to be limited to the methyl group as other substituents acting in the same manner may be substituted for one of the reactive hydrogen atoms. For example, one of the reactive hydrogen atoms may be substituted by an inorganic negative atom such as a chlorine atom which would form a chlorophenol, for example, ortho-chlorophenol.

Para-cresol-dialcohol is formed by the reaction of two molecules of formaldehyde with one molecule of para-cresol. The preparation of such compounds has been described by Ullmann and Brittner (German Chemical Society 1909, page 2540). As described therein, the sodium salt of para-cresol-dialcohol was prepared and separated out as a white substance by mixing one mol. of para-cresol with two mols of formaldehyde and one mol. of sodium hydroxide leaving the mixture standing at room temperature for a few days. By the addition to a solution of the white substance of an acid such as acetic acid, free para-cresol-dialcohol can be obtained as a white crystallized mass, which, after recrystallization from ethylacetate, had a melting point of 130° C.

The formation of the para-cresol-dialcohol in the manner mentioned in the preceding paragraph may be represented as follows:

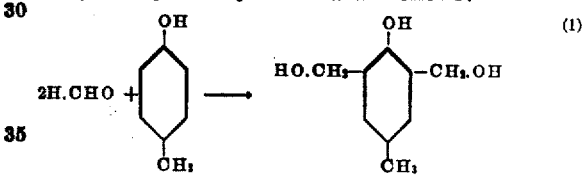

(1)

When two of the reactive hydrogen atoms are substituted in the phenol molecule, the molecule can react with only one molecule of formaldehyde thereby forming a mono-alcohol of double substituted phenol.

For example, the synthesis of 2.4-dimethyl-phenol-6-mono-alcohol may be represented by the following equation:

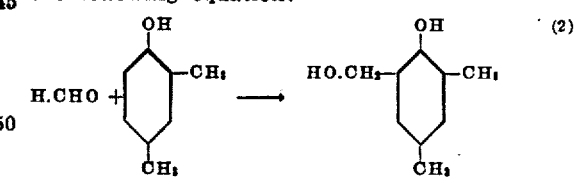

(2)

The dialcohols and mono-alcohols referred to in the preceding description may also be designated chemically as di-methylol- and monomethylol-derivatives of a substituted phenol, and from this point on they will be so designated. According to this nomenclature the reaction product shown in Equation 1 is 2.6-dimethylol-4-methyl-phenol and the reaction product shown in Equation 2 is 2.4-dimethyl-6-methylol-phenol.

In the above description, the meta or 3 and 5 positions in the phenol or substituted phenol have not been discussed, as these positions are innocuous in the sense of the present invention, but may be satisfied by hydrogen atoms although any neutral group may be substituted just as well.

It has been determined that the di- and mono-methylol derivatives of substituted phenols described above, either as such or in the form of their salts such as the sodium salt, may enter into a compound with rubber, which is probably due to the double bonds present. The di-methylol derivatives appear to have a considerably stronger reaction than the mono-methylol derivatives.

In my copending application, Serial No. 658,743, filed April 1, 1946, it is disclosed and claimed that these di- and mono-methylol derivatives of substituted phenols and their salts can also react with cellulose. According to the present invention, the above described compounds are used to effect a chemical bond between cellulose and rubber, thereby bonding these substances together. The di-methylol derivatives are especially suited for the purpose since they can react at one side with a cellulose molecule and at the other side with a rubber molecule. An additional advantage when treating a regenerated cellulose is that the strength of the rayon is found to increase about 10%.

In the known methods of attempting to properly bond rubber and cellulose by means of phenol-aldehyde resins the same results were not attained, because those types of plastics polymerized too quickly to react with the rubber and cellulose. This resulted from the use of raw materials involving an unsubstituted phenol where all of the three reactive hydrogen atoms were present which reacted with formaldehyde to form a tri-methylol derivative of phenol. These plastics were merely embedded in the composite product without entering into a chemical bond with them.

The present invention, on the other hand, is concerned primarily with the use of the di- and mono-methylol derivatives of substituted phenols which polymerize much more slowly, so that under the proper conditions, such as choice of temperature, etc., they can be made to react with rubber and cellulose.

It is of the greatest importance to provide a strong bond or firm adhesion between rubber and cellulose, as in many industries, such as those engaged in the manufacture of rubber tires for all types of automotive vehicles, it is necessary to effect a substantially permanent attachment of the rubber with the so-called carcass of textile fabric, rayon, artificial wool or cotton.

In carrying out the present process, the rayon which is to be combined with rubber may be immersed in a solution of a di-methylol derivative or of the salt thereof, or in some cases, a mono-methylol derivative or its salt may be employed. After centrifuging and drying, the treated rayon is combined with rubber during vulcanization, whereby a chemical compound or union of the three basic substances is formed.

Alternatively, the di- or mono-methylol derivatives of the substituted phenols may be mixed in the dry state with the rubber, after which the rayon is bonded to the rubber during vulcanization.

A third method is to treat the rayon with the desired di- or mono-methylol derivative, mix a further quantity of the latter in a dry state with the rubber and then vulcanize the entire mass. This procedure is in fact a combination of the above two mentioned methods.

*Example*

A rayon fabric was immersed in a 2½% solution of 2.6-dimethylol-4-methyl-phenol at 75° C. with subsequent centrifuging and drying. Strips of this fabric were placed on sheets of unvulcanized rubber mixed with the usual ingredients used during vulcanization, whereupon the mass was vulcanized at 150° C. for 10 minutes.

When using the "pull-out" test which measures the force required to separate the fabric from the rubber, it was found that a force of 3.3 kilograms was required to separate the rayon from the rubber. When the same test was applied to untreated fabric, the force required was only 2.7 kilograms. Thus the degree of improvement in this instance was of the order of 22%.

It is not necessary to separate the condensation products before using them, as the liquor in which they are formed can be used directly. For instance, it is possible to dissolve 20 grams of para-cresol in 45 grams of 20% caustic soda solution to which 36 c. c. of 35% formaldehyde are added, after which this mixture is allowed to stand at room temperature for three days. Thereupon water is added to make up to 1 liter which causes the separated sodium salt to go into solution. This solution can be used directly or with the aid of an acid, for example, acetic acid, the 2.6-dimethylol-4-methyl-phenol can be set free. It is, in the latter case, only necessary to bring the temperature to 70°-100° C., since the 2.6-dimethylol-4-methyl-phenol would otherwise crystallize out. The equally improved results can be obtained using either the 2.6-dimethylol-4-methyl-phenol or the sodium salt thereof.

What is claimed is:

1. Vulcanized rubber articles reinforced with cellulosic products, said rubber articles and cellulosic products being bonded together by chemical reaction at their boundary surfaces respectively with a compound of the class consisting of di-methylol derivatives of mono-substituted phenol, mono-methylol derivatives of double substituted phenol and their salts, wherein the aforesaid substituents occupy the so-called reactive positions in the phenol nucleus.

2. Vulcanized rubber articles reinforced with rayon products, said rubber articles and rayon products being bonded together by chemical reaction at their boundary surfaces respectively with a compound of the class consisting of di-methylol derivatives of mono-substituted phenol, mono-methylol derivatives of double substituted phenol and their salts, wherein the aforesaid substituents occupy the so-called reactive positions in the phenol nucleus.

3. A method of bonding cellulose products to rubber which comprises surface treating the cellulose product with a compound of the class consisting of di-methylol derivatives of mono-substituted phenol, mono-methylol derivatives of double substituted phenol and their salts, wherein the aforesaid substituents occupy the so-called reactive positions in the phenol nucleus, centrifuging and drying the cellulose product, combining the treated cellulose product with rubber and vulcanizing the composite product.

4. A method of bonding viscose rayon to rubber which comprises surface treating the rayon with a compound of the class consisting of di-methylol derivatives of mono-substituted phenol, mono-methylol derivatives of double substituted phenol and their salts, wherein the aforesaid substituents occupy the so-called reactive positions in the phenol nucleus, centrifuging and drying the rayon, combining the treated rayon with rubber and vulcanizing the composite product.

5. A method of bonding viscose rayon to rubber which comprises surface treating the rayon with a di-methylol derivative of mono-substituted phenol, wherein the substituent occupies a so-called reactive position in the phenol nucleus, centrifuging and drying the rayon, combining the treated rayon with rubber and vulcanizing the composite product.

6. A method of bonding viscose rayon to rubber which comprises surface treating the rayon with a solution of 2.6-dimethylol-4-methyl-phenol, centrifuging and drying the rayon, combining the treated rayon with rubber and vulcanizing the composite product.

7. A method of bonding viscose rayon to rubber which comprises surface treating the rayon with a 2.5% solution of 2.6-dimethylol-4-methyl-phenol at 75° C., centrifuging and drying the rayon, combining the treated rayon with rubber and vulcanizing the composite product at 150° C. for about ten minutes.

8. A method of bonding viscose rayon to rubber which comprises surface treating the rayon with a solution of the sodium salt of 2.6-dimethylol-4-methyl-phenol, centrifuging and drying the rayon, combining the treated rayon with rubber and vulcanizing the composite product.

JOHANNES G. WEELDENBURG.

REFERENCES CITED

The following references are of record in the file of this patent:

UNITED STATES PATENTS

| Number | Name | Date |
|---|---|---|
| 1,734,516 | Foulds et al. | Nov. 5, 1929 |
| 2,128,229 | Charch et al. | Aug. 30, 1938 |
| 2,158,494 | Corteen et al. | May 16, 1939 |
| 2,288,695 | Fuller | July 7, 1942 |

FOREIGN PATENTS

| Number | Country | Date |
|---|---|---|
| 484,691 | Great Britain | Aug. 4, 1936 |

OTHER REFERENCES

Serial No. 357,662, Wildschut (A. P. C.), pub. Apr. 20, 1943.

The Chemistry of Synthetic Resins, Ellis, vol. 1 (1935), "Phenol-Aldehyde Resins," pp. 292-3.

Industrial and Engineering Chemistry, Apr. 1932, Aug., Oct., Nov. 1937. A series of articles on "Condensation of Phenols with Formaldehyde," by F. S. Granger.